Feb. 20, 1951     D. A. BROWN     2,542,391
WATER SOFTENER VALVE

Filed July 14, 1947     3 Sheets-Sheet 1

INVENTOR:
DAN A. BROWN
BY
ATTORNEYS.

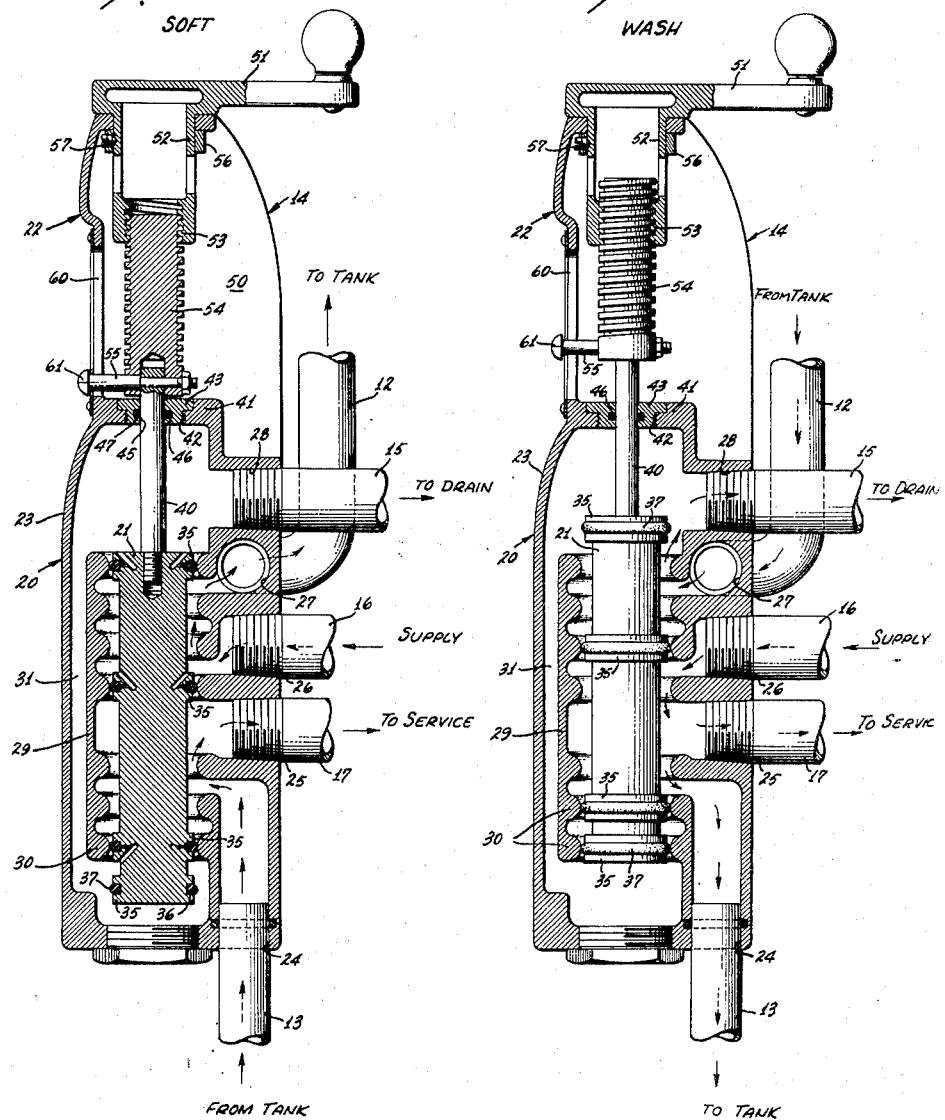

Feb. 20, 1951 — D. A. BROWN — 2,542,391
WATER SOFTENER VALVE
Filed July 14, 1947 — 3 Sheets-Sheet 3
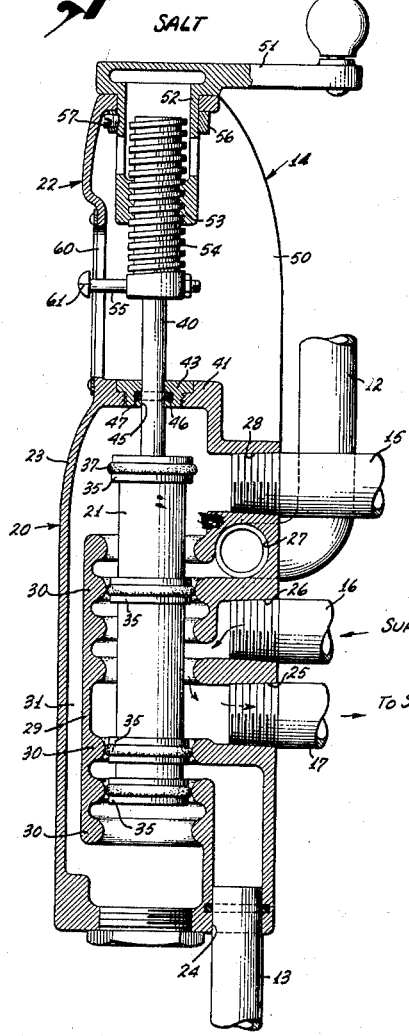
Fig. 4. SALT
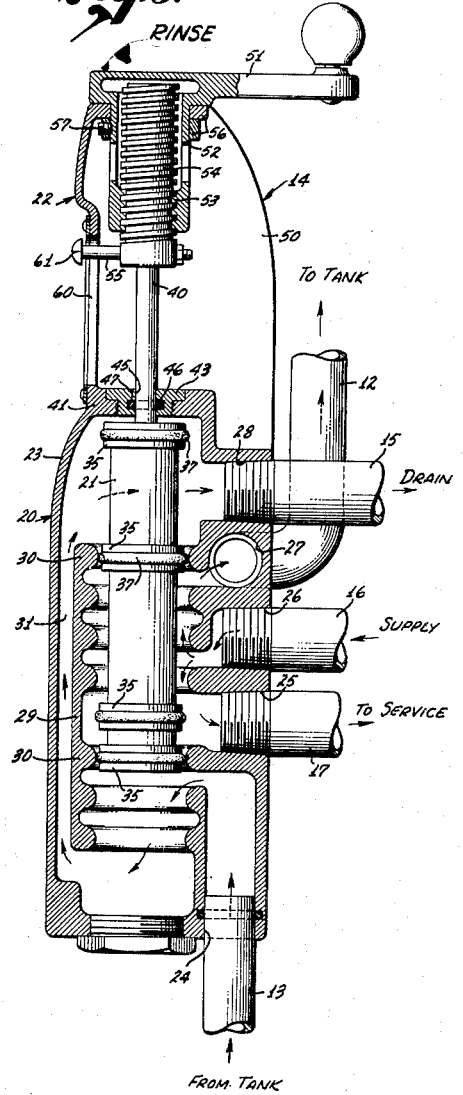
Fig. 5. RINSE
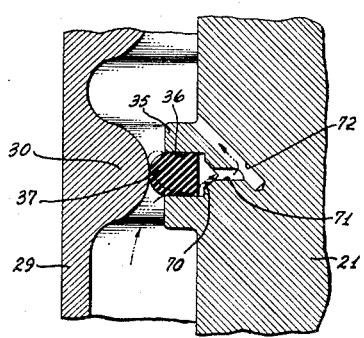
Fig. 6.
INVENTOR:
DAN A. BROWN
BY Huebner, Maltby
and Beehler
ATTORNEYS.

Patented Feb. 20, 1951

2,542,391

UNITED STATES PATENT OFFICE 2,542,391

WATER SOFTENER VALVE

Dan A. Brown, Long Beach, Calif., assignor to Rheem Manufacturing Company, Richmond, Calif., a corporation of California Application July 14, 1947, Serial No. 760,780

4 Claims. (Cl. 251—77)

This invention relates to a multiple-way valve unit and has more particular reference to a multiple-way valve unit wherein the valves are carried on a single reciprocating stem adapted upon reciprocal movement to direct the flow of fluids into one or more of a plurality of discharges.

The primary object of my invention is to produce a valve having a plurality of inlets and discharges, a plurality of valve seats in axial alignment, and a plurality of valves carried by a single reciprocating stem and adapted to engage the various valve seats upon reciprocation of the stem, thereby directing the fluid into the various inlets and discharges.

The primary object of this invention was to provide a valve structure of the above-described character which is especially applicable for use in controlling the flow of water through a reservoir containing a water treating element, where it is desired to flow water from a source of supply through the reservoir in one direction during the treating operation, then effect reconditioning of the treating element involving flowing the water through the reservoir in a reverse direction to effect a flushing action, cutting off the flow of water through the reservoir while subjecting the contents of the latter to the action of a chemical applied therein and thereafter directing the flow of action through the reservoir in a fashion to flush out the chemical. It is to be understood, of course, that the improvement introduced into the art by my invention is not limited to its application to water-softening equipment, but has a wide variety of uses wherein it is desired to control the flow of fluids from an inlet under relatively high pressure to a plurality of discharges. The invention will, however, in this application be described in connection with a water softening equipment. I am aware of the fact that other valves of this general character have been heretofore developed and used. However, it has been found that prior attempts have not been satisfactory in that there was a tendency for the valve washer to pull out of its seat in the reciprocating stem in the event of a reversal of direction of the reciprocating stem while under pressure.

It is an object of my invention to produce an improvement in this type of reciprocating stem valve which eliminates the difficulty of the valve washer material being forced out of the valve stem seat and sheared off in the event of a reversal of the direction. It will be understood that such improved valve will be applicable to a great many uses and not just to a valve for a water softening system.

Other and further objects and advantages will become apparent from the drawings and the specifications relative thereto.

In the drawings:

Figure 2 is a sectional view of a valve embodying my invention showing the valve stem in its lowermost position.

Figure 3 is a sectional view similar to Figure 2 showing the valve stem in the second position.

Figure 4 is a sectional view similar to Figure 2 showing the valve stem in the third position.

Figure 5 is a sectional view similar to Figure 2 showing the valve stem in a top or fourth position.

Figure 6 is an enlarged sectional detail of a portion of the valve stem, valve face and valve seat.

Figure 1:
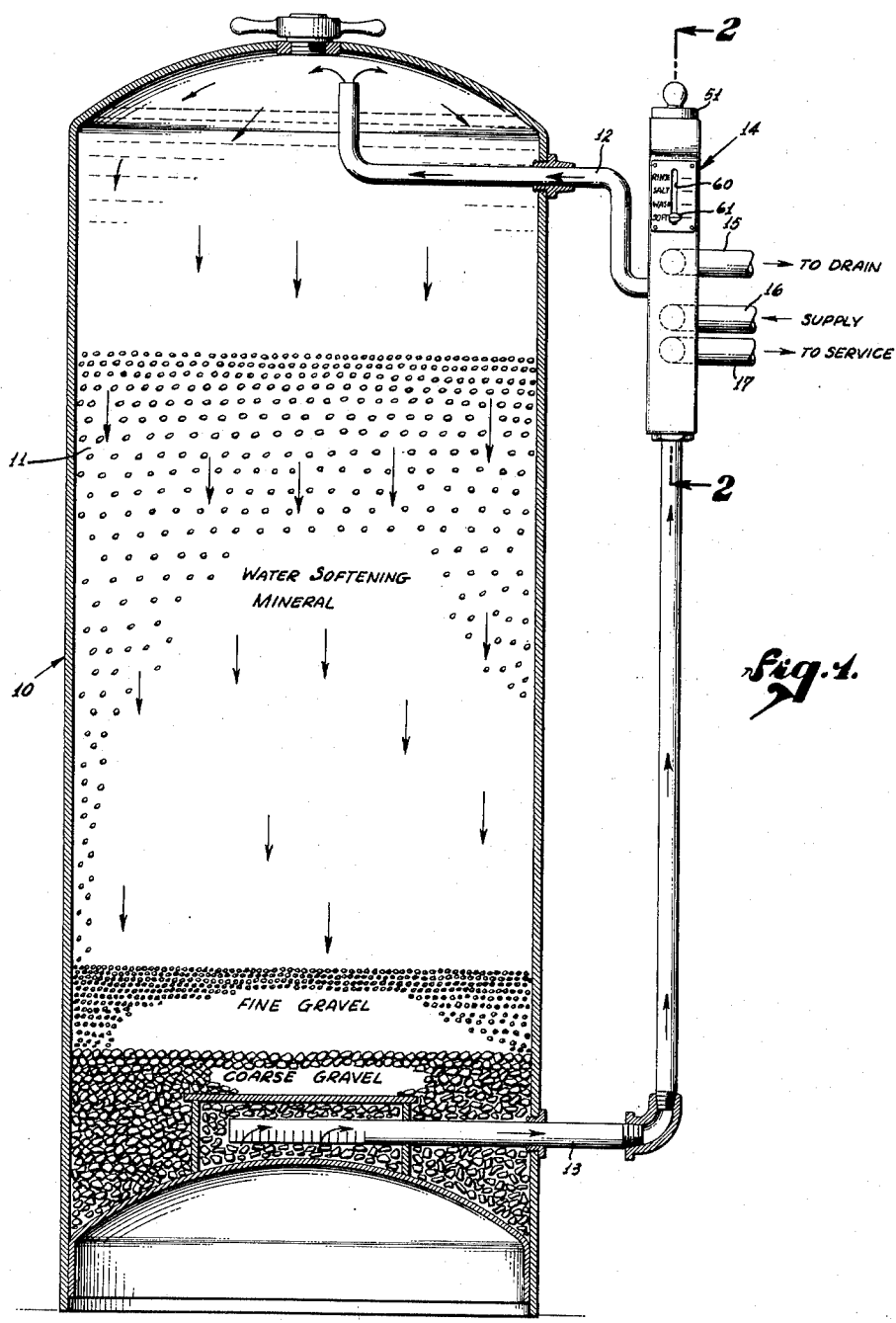
Figure 1 illustrates a water softening system having a valve incorporating therein an embodiment of my invention.

Referring more specifically to Figure 1 wherein I have illustrated a water softening system using a valve embodying the principles of my invention, the system comprises essentially a tank 10 containing any suitable water softening material 11 and provided with an inlet conduit 12 located adjacent the top of the tank 10, a discharge conduit 13 located adjacent the bottom portion of the tank 10. The conduits 12 and 13 are connected to a valve, designated generally 14, which said valve is also provided with conduits 15 connected to a drain; 16 connected to a supply of water; and 17 connected to a service requirement of the establishment using the water softening system.

Referring to Figure 2, I have shown the details of construction of a valve embodying the principles of my invention and particularly adapted for use in connection with a water softener system. The valve comprises essentially a valve body 20, a piston 21, a control mechanism designated generally 22.

The valve body 20 comprises a housing 23 having a plurality of ports 24, 25, 26, 27 and 28, and a centrally disposed cylindrical member 29, which said cylindrical member is formed with a plurality of spaced lands or valve seats 30 defining a plurality of chambers. The cylindrical member 29 is in communication with the ports 24, 25, 26 and 27 by means of openings into the chambers; i. e., between the spaced lands or valve seats 30 and in communication with the port 28 by means of a by-pass 31 formed in the wall of the housing 23.

The piston 21 is formed with a plurality of bosses or valve discs 35, each of which is formed with a peripheral groove 36 adapted to receive and retain a valve washer 37. The valve washer is a D ring and is made of any resilient material, such as rubber or neoprene, or the like. By D ring is meant a circular ring having a substantially D-shaped cross-section. It will be understood that the interior diameter of the D ring is slightly smaller than the inside diameter of the groove 36 and that the outside diameter of the D ring is slightly larger than the inside diameter of the valve seats 30 so that when the D ring is in registry with the valve seat 30 a fluid-tight contact will be made. A piston rod 40 is threadedly attached to the piston 21 and extends upwardly through the top of the housing 23. The top portion 41 of the housing 23 is formed with a longitudinally threaded bore 42 adapted to receive a bushing 43. The piston rod 40 is adapted to reciprocate through a bore 45 in the bushing 43. A sealing engagement is effected by means of an O ring 46 which is disposed in an internal annular groove 47.

The operating mechanism 22 comprises a bracket 50 extending upwardly from the housing 23, a crank handle 51 which is rotatably mounted on the top of the frame 50 and adapted to rotate about an axis which is common to piston 21 and piston rod 40. The crank handle 51 is formed with a hollow stem 52 having an internal threaded section 53 at the lower end thereof.

A threaded shaft 54 is secured to piston rod 40 by means of a shoulder bolt 55 and is in threaded engagement with the threaded section 53, thereby being adapted to be drawn upwardly into the hollow stem 52 upon rotation of the handle 51. The handle 51 is secured in position by means of an annular ring 56 and a set screw 57.

The shoulder bolt 55 extends outwardly through a slot 60 formed in the frame 50 and carries an indicator 61 on the end thereof. The shoulder bolt 55 and the indicator 61 serve to prevent rotation of the threaded shaft 54 and the piston rod 40 and also act as an indicating means to indicate the position of the piston 21.

The valve is shown in normal, or "soft," position in Figure 2, illustrating the piston 21 provided with four valves 35, one of which is disposed intermediate the supply inlet 16 and the service line 17; one of which is disposed between the tank supply conduit 27 and the drain 15; and one of which is disposed between the tank return line 13 and the by-pass 31. Thus, it will be seen that in the position shown in Figure 2 water will be supplied through the conduit 16 into the conduit 12 downwardly through the tank, returning through conduit 13 and into the service line 17.

As shown in Figure 3, in the position designated "wash," it will be seen that the piston 21 has been raised by operation of the crank handle 51 and its associated mechanism so that the inlet 16 is in communication with the service line 17 and the tank return 13. The tank supply conduit 12 is now in communication with the drain line 15. Thus, it will be seen that without interrupting the supply to service 17, water has been reversed through the tank so that any undesirable impurities which are soluble can be leached therefrom.

Figure 4 shows the valve in a third or "salt" position with the piston raised so that the only operative communication existing is between the supply 16 and service 17. It it during this position that salt is introduced into the top of the tank 10 to regenerate a water softening material.

After sufficient time has elapsed to regenerate the water softening material the crank handle 51 is again rotated sufficiently to raise the piston 21 to its uppermost position, shown in Fig. 5, where the supply inlet communicates with the service and the tank supply line 12. The tank return 13 communicates to the drain 15 through the by-pass 31. After the salt has been rinsed from the water softening tanks, the piston 21 is returned to the position shown in Figure 2 and is then ready for another cycle of de-ionizing or softening water.

During the course of the operation just explained it is, of course, clear that the valves 35 must pass the valve seats 30 while moving away from the high pressure side. It had previously been noted that the valve washer 37 was frequently sheared off or pulled out of the peripheral groove 36. Experimentation showed that as the valve washer 37 passed the peak of the valve seat 30 while moving away from the high pressure side, the pressure of the fluid was sufficient to force the valve washer 37 to expand and follow the contour of the valve seat 30. It is clear under these conditions that any reversal of direction of the piston 21 would result in a shearing or rupture of the valve washer 37, thereby rendering the valve for practical purposes inoperable.

Figure 6 illustrates an improvement in this type of valve which avoids such difficulty. A peripheral, substantially V-shaped groove 70 is cut around the inner face of the peripheral groove 36. Relief holes 71 are drilled at spaced intervals radially from the bottom of the V-shaped groove 70 and communicate with relief ports 72 to the low pressure side of the valve disc 35. Figure 6 indicates the action of this relief porting arrangement. The valve washer 37 upon approaching the descending side of the valve seat 30 is forced by the pressure of the water into a position indicated in phantom. As the pressure of the water forces the valve washer outwardly it pulls away from the bottom peripheral groove 36, thereby permitting a communication between the fluid in the high pressure side to the low pressure side through the relief ports 71 and 72. When the pressure has been relieved through these relief ports the valve washer 37 snaps back into position, creating a clearance between it and the valve seat 30.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having described my invention, what I claim as new and desire to secure by Letters Patent is:

1. In a valve for a water softener tank, a housing having a bore, a series of spaced circumferentially extending inwardly projecting valve seats in said bore, said bore embodying a chamber between each of the contiguous valve seats and an end chamber at each end of the series of valve seats, a fluid passage leading to the exterior of the housing from each of the chambers located between the valve seats including a passage for communication with the upper end of a softener tank, a passage for communication with the lower end of a softener tank and a pair of intermediate passages constituting a water supply passage and a water service passage; said housing also having a waste passage leading from one of said end chambers and having a by-pass passage connecting said end chambers, a longitudinally reciprocable valve stem extending axially of said bore, means for reciprocating said stem, and an assembly of a plurality of spaced valve elements carried on said stem arranged for sealing engagement with certain of said valve seats thereby dividing said bore into high and low pressure areas, and for positioning in certain of said chambers; each of said valve elements comprising a disc formed with a peripheral groove having a bottom and a resilient D-ring disposed in said groove adapted for sealing engagement between said bottom and said valve seats, said disc being formed with at least one aperture communicating between said peripheral groove and the low pressure side of said valve; said valve elements being proportioned relative to said chambers to afford a passage around a valve element when positioned in a chamber; said valve assembly when in one position establishing communication from the water supply passage and the passage for communication with the upper end of a tank and between the passage for communication with the lower end of a tank and the water service passage, and in a second position establishing communication between the water supply passage, the water service passage and the passage for communication with the lower end of a tank and between the passage for communication with the upper end of a tank and the waste passage; the said assembly when in a third position maintaining communication between the water supply passage and the water service passage and closing communication between said passages and the passage for communication with the ends of a tank; and said assembly when in a fourth position maintaining communication between the water supply passage and the water service passage and opening communication between the passage for communication with the lower end of a tank and the waste passage through the by-pass passage.

2. In a valve for a water softener tank, a housing having a bore, a series of spaced circumferentially extending inwardly projecting valve seats in said bore, said bore embodying chambers between contiguous valve seats and at the end portions thereof, a fluid passage leading to the exterior of the housing from each of the chambers located between the valve seats including a passage for communicating with the upper end of a softener tank, a passage for communicating with the lower end of a softener tank, and a pair of intermediate passages constituting a water supply passage and a water service passage; said housing also having a waste passage leading from one of said end chambers and having a by-pass passage connecting said end chambers; a longitudinally reciprocal valve stem extending axially of said bore, means for reciprocating said stem, and an assembly of a plurality of spaced valve elements carried on said stem arranged for sealing engagement with certain of said valve seats, thereby dividing said bore into high and low pressure areas, and for positioning in certain of said chambers; each of said valve elements comprising a disc formed with a peripheral groove having a bottom and a resilient D-ring disposed in said groove adapted for sealing engagement between said bottom and said valve seats, said disc being formed with at least one aperture communicating between said peripheral groove and the low pressure side of said valve; said valve elements being proportioned relative to said chambers to afford a passage around a valve element when positioned in a chamber; said valve assembly in one position establishing communication between the water supply passage and the passage for communication with the upper end of the tank and also establishing communication between the water service passage and the passage for communication with the other end of the tank, and when in said position closing communication between the water supply passage and the water service passage and between the water supply passage and the waste passage and between the water service passage and the by-pass passage; said valve assembly in another position establishing communication between the water supply passage and the water service passage and between the water supply passage and the passage for communication with the lower end of the tank and establishing communication between the passage for communication with the upper end of the tank and the waste passage, and when in such position closing communication between the water supply passage and the passage for communicating with the upper end of the tank and closing communication between the passage for communication with the other end of the tank and the by-pass passage; said valve assembly when in a third position maintaining communications between the water supply passage and the water service passage and closing communication between the water supply passage and the water service passage with the passages for communication with the ends of the tank; and said valve assembly when in a fourth position maintaining communication between the water supply passage and the water service passage and establishing communication between the water service and the passage for communication with the upper end of the tank and establishing communication between the passage for communication with the lower end of the tank and the by-pass passage, and in said fourth position closing communication between the passage for communication with the upper end of the tank and the chamber communicating directly with the waste passage, and also closing communication between the water service passage and the passage for communication with the lower end of the tank and to the by-pass passage.

3. A water softening valve comprising a housing having a chamber at each end thereof and formed with a by-pass passage connecting said chambers, forming an open communication therebetween at all times, an open waste passage leading from one of said end chambers, a series of four chambers interposed between said end chambers including a pair of chambers comprising an inlet and an outlet chamber and chambers intermediate said pair of chambers and the end chambers, a passage leading from each of said intermediate chambers to the exterior of said housing, an inlet passage leading to said inlet chamber, an outlet passage leading from said outlet chamber, an annular valve seat between each of adjacent chambers, a reciprocal valve stem extending axially of said valve seats, and a valve assembly on said stem comprising a plurality of spaced valves fixed on said stem for cooperation with said seats, thereby dividing said bore into high and low pressure areas; each of said valves comprising a disc formed with a peripheral groove having a bottom and a resilient D-ring disposed in said groove adapted for sealing engagement between said bottom and said valve seats, said disc being formed with at least one aperture communicating between said peripheral groove and the low pressure side of said valve; said seats and valves being relatively arranged to dispose a valve on each end seat and on a seat between the intake and outlet chambers to close the end chambers to the chambers interposed therebetween and to close communication between the inlet and outlet chambers when the valve assembly is in a first or one of its extreme positions; and when said valve assembly is in a successive second position to dispose the valve previously on the seat between the end chamber from which leads the waste passage to open said chamber to its adjacent intermediate chamber, and then dispose the valve previously on the seat between the intake and outlet chambers on a seat between the intake chamber and the adjacent intermediate chamber, and also maintain a valve on the seat between the other intermediate chamber and the adjacent end chamber and providing open direct communication between the inlet and outlet chamber and between the outer chamber and the adjacent intermediate chamber; and when said valve assembly is in a third consecutive position to dispose a valve on a seat between the intake chamber and the adjacent intermediate chamber, and another valve on the seat between the outlet chamber and the adjacent intermediate chamber, and with another valve on the seat between said last named intermediate chamber and its adjacent end chamber, and then providing open communication with the inlet chamber and the outlet chamber, and open communication between the end chamber from which the waste passage leads with its adjacent intermediate chamber; and when said valve assembly is in a successive fourth position to dispose a valve on the seat between the end chamber from which the waste passage leads and the adjacent intermediate chamber, with another valve positioned on the seat between the outlet chamber and its adjacent chamber, and then providing open communication between said last named intermediate chamber and the adjacent end chamber through said end chamber and the by-pass passage to the waste passage through the other end chamber, and at the same time maintain open communication between the intake chamber and the outlet chamber, and provide open communication between the outlet chamber and the adjacent intermediate chamber.

4. The structure called for in claim 3 together with means for reciprocating said valve stem and means associated therewith for indicating the several recited positions of the valve assembly.

DAN A. BROWN.

REFERENCES CITED

The following references are of record in the file of this patent:

UNITED STATES PATENTS

| Number | Name | Date |
|---|---|---|
| 331,789 | Harvey | Dec. 8, 1885 |
| 744,643 | Swan | Nov. 17, 1903 |
| 1,087,890 | Rogers | Feb. 17, 1914 |
| 1,517,593 | Slate | Dec. 2, 1924 |
| 1,721,114 | Hampton | July 16, 1929 |
| 2,011,674 | Canady | Aug. 20, 1935 |